US008142073B2

(12) United States Patent
Clark

(10) Patent No.: US 8,142,073 B2

(45) Date of Patent: Mar. 27, 2012

(54) SNAP-FIT SENSOR ASSEMBLY

(75) Inventor: John Thomas Clark, Kersey, PA (US)

(73) Assignee: General Electric Company, Schenectady, NY (US)

( * ) Notice: Subject to any disclaimer, the term of this patent is extended or adjusted under 35 U.S.C. 154(b) by 42 days.

(21) Appl. No.: 12/649,969

(22) Filed: Dec. 30, 2009

(65) Prior Publication Data

US 2011/0158287 A1 Jun. 30, 2011

(51) Int. Cl.
*G01K 1/00* (2006.01)
*G01K 7/00* (2006.01)

(52) U.S. Cl. ........................ 374/208; 374/185; 374/148

(58) Field of Classification Search .................. 374/203, 374/148, 185
See application file for complete search history.

(56) References Cited

U.S. PATENT DOCUMENTS 4,179,309 A * 12/1979 Hance et al. .................. 136/234
5,038,741 A 8/1991 Tuckey
5,438,877 A 8/1995 Vowles et al.
5,733,044 A * 3/1998 Rose et al. .................... 374/144
5,823,843 A 10/1998 Pohlman
5,920,193 A 7/1999 Tola et al.
5,980,330 A 11/1999 Veselaski et al.
6,374,685 B1 * 4/2002 Daly ........................... 73/866.5
6,395,415 B1 * 5/2002 Hoehn et al. .................. 429/442
6,435,017 B1 * 8/2002 Nowicki et al. ............ 73/114.68
6,774,623 B2 * 8/2004 Palfenier et al. ......... 324/207.15
2003/0033897 A1 * 2/2003 Easton ......................... 73/866.5
2004/0042845 A1 3/2004 Shost et al.

FOREIGN PATENT DOCUMENTS

EP 0612667 A2 8/1994

* cited by examiner

*Primary Examiner* — Lisa Caputo
*Assistant Examiner* — Mirellys Jagan
(74) *Attorney, Agent, or Firm* — Hiscock & Barclay LLP

(57) ABSTRACT

A two-piece sensor assembly is disclosed comprising a sensor body insert having a thermoplastic sensor body molding that can be snap-fit into a thermoplastic sensor housing a spherical-type snap-fit eliminating leak paths or openings that may damage the sensor body.

15 Claims, 4 Drawing Sheets

SNAP-FIT SENSOR ASSEMBLY

BACKGROUND OF THE INVENTION

The subject matter disclosed herein relates to a sensor assembly, and more specifically, a snap-fit sensor assembly.

In a number of industries, including the automotive industry, sensors are used to monitor a variety of parameters, including, for example, temperature. These sensors typically have a sensor housing encasing a sensor body (e.g., a thermistor assembly for measuring temperature) to protect the sensor body from damage or corrosion caused by the environment in which the sensor must operate, including, for example, chemicals and inclement weather. In addition to offering protection, the sensor housing is typically configured to be mounted on and mate with a part having an opening to receive the sensor housing. For example, the sensor housing may have threads to mate with threads in an opening on the part onto which the sensor is mounted.

In order to provide the required protection of the sensor body and configuration to mate with the receiving parts, sensor housings are typically made using injection molded thermoplastic that covers the sensor body and is shaped to mate with the receiving parts. Sensor housings are preferably formed by injecting the thermoplastic material into a mold. It is desirable that the thermoplastic material sufficiently encase the sensor body without any areas of the sensor body touching the outer surface of the thermoplastic material (i.e., touching out) since these areas with thin or no cover of the sensor body by the thermoplastic material provide unwanted leak paths or other openings to the environment which can, over time, lead to damage and corrosion of the sensor body by, e.g., chemicals, inclement weather, etc. (causing an electrical short, high resistance, or an open circuit).

In many cases, however, it is difficult to avoid the formation of these areas of touching out. For example, in a typical manufacturing process, the sensor body is placed into the center of the injection mold for the sensor housing prior to the injection of the thermoplastic material. During injection of the thermoplastic material, the force of the plastic can push or move the sensor body from its original centered position to one side of the injection mold such that the sensor body comes in contact with the side of the injection mold, limiting the amount of thermoplastic material that can flow through that touching out point to cover the sensor body. In addition to the risk of touching out, this typical manufacturing process can also be labor intensive since it requires the careful placement of the sensor body into the injection mold prior to injection of the thermoplastic material.

It would be advantageous to eliminate the risk of touching out and minimize the labor required in manufacturing these sensor assemblies.

BRIEF DESCRIPTION OF THE INVENTION

A two-piece sensor assembly is disclosed comprising a sensor body insert having a thermoplastic sensor body molding that can be snap-fit into a thermoplastic sensor housing a spherical-type snap-fit eliminating leak paths or openings that may damage the sensor body.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of invention. Thus, for further understanding of the invention, reference can be made to the following detailed description, read in connection with the drawings in which.

DETAILED DESCRIPTION OF THE INVENTION

Although the invention is described using the exemplary sensor assembly of an outdoor air temperature (OAT) sensor, it will be understood that the invention can be used for a variety of different types of sensor assemblies suitable for use with the inventive two-piece design.

Figure 1:
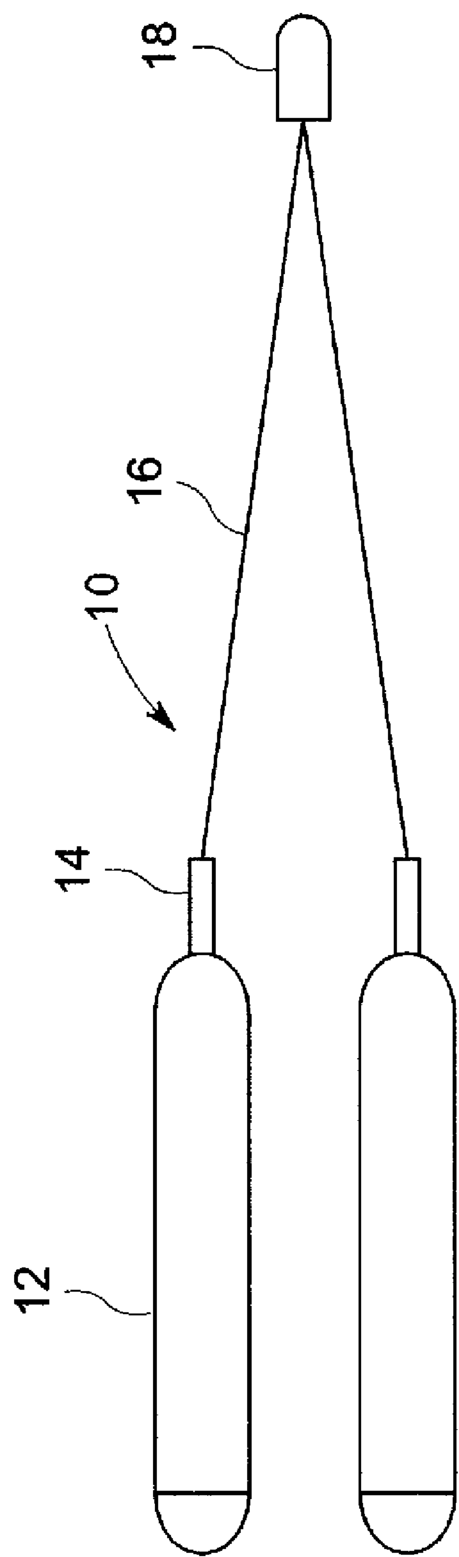
FIG. 1 is a sensor body in one exemplary embodiment of the invention.

FIG. 1 illustrates an exemplary sensor body 10 (e.g., a thermistor assembly) for an OAT sensor in one exemplary embodiment of the invention. In this example, the sensing device 18 (e.g., a ceramic NTC thermistor) used for sensing temperature by varying resistance can be connected to a pair of sensor terminals 12 via a pair of wires 16 that can be crimped to the sensor terminals 12 at crimp locations 14. In order to protect the sensor body 10, and in particular the sensing device 18, from the environment, thermoplastic material can be used to cover the sensor body 10.

Figure 2:
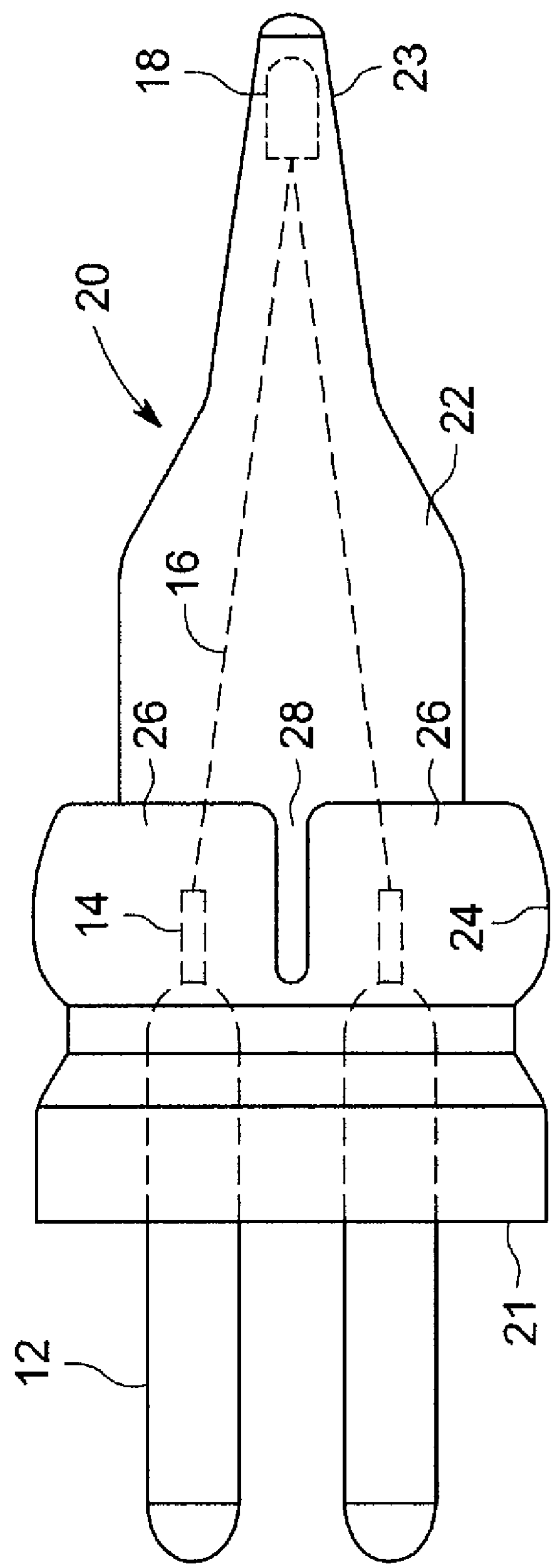
FIG. 2 is a sensor body insert in one exemplary embodiment of the invention.

FIG. 2 illustrates an exemplary sensor body insert 20 (male) in one exemplary embodiment of the invention. The sensor body insert 20 can include a thermoplastic sensor body molding 21 covering at least a portion of the sensor body 10, including the sensing device 18, wires 16, crimp locations 14, and a portion of the sensor terminals 12. In one embodiment, the thermoplastic sensor body molding 21 can be molded over the sensor body 10. The sensor body molding 21 can perform both functions of covering the sensor body 10 and interfacing with the sensor housing 30.

As for the first function, covering the sensor body 10, the sensor body molding 21 can include a sensor body cover 22 at its core contacting and covering the sensor body 10. The sensor body cover 22 can include a tip 23 that covers the sensing device 18 of the sensor body 10, but allows for "touching out." As for the second function, interfacing with the sensor housing 30, the sensor body molding 21 can include an arcuate ring 24 on its periphery, at least a portion of which is of greater diameter than the sensor body cover 22 that can interface with the sensor housing 30 using a spherical-type snap-fit, which will be discussed below. The arcuate ring 24 can extend around a portion of the sensor body cover 22 forming an open space between the arcuate ring 24 and the sensor body cover 22. This arcuate ring 24 can include one or more size-adjustable slots 28 (i.e., openings) that form separate arms 26 in the arcuate ring 24 that can increase the flexibility of the arcuate ring 24 allowing the arms 26 to bend toward the sensor body cover 22 through the open space between the arcuate ring 24 and the sensor body cover 22 under force during assembly.

Figure 3:
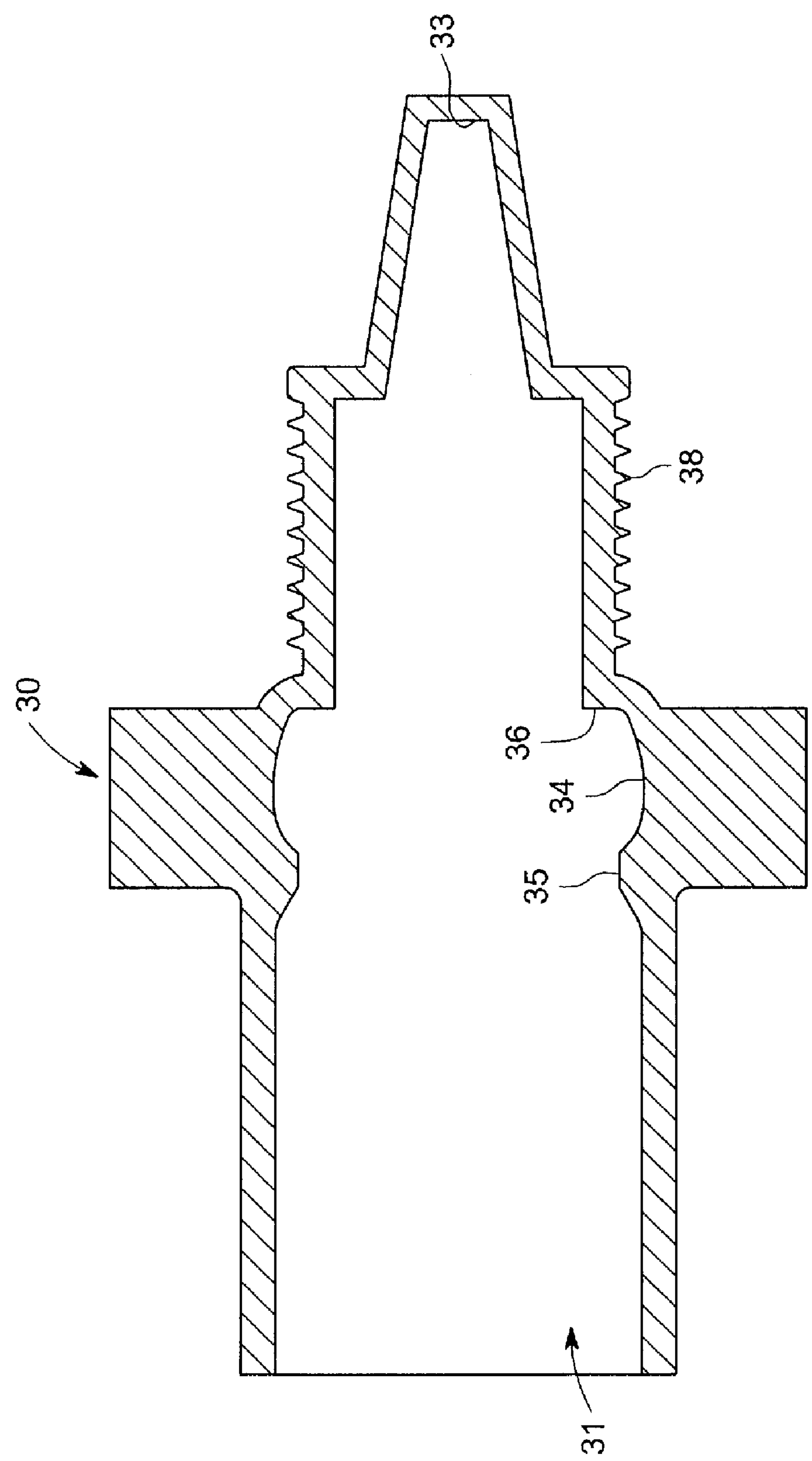
FIG. 3 is a cross-section of a sensor housing in one exemplary embodiment of the invention.

FIG. 3 illustrates a cross-section of an exemplary sensor housing 30 (female) in one exemplary embodiment of the invention. The sensor housing 30 can include a sensor housing cavity 31 designed and shaped to mate with and receive sensor body insert 20 shown in FIG. 2. For example, the sensor housing cavity 31 can include a tip 33 to receive the tip 23 of the sensor body cover 22. Similarly, the sensor housing cavity 31 can include an arcuate inner surface 34 circumscribing the sensor housing cavity 31 and shaped to receive the arcuate ring 24 of the sensor body molding 21 after the arcuate ring 24 deforms during assembly and passes the ridge 35 circumscribing the sensor housing cavity 31. A step 36 can be located after the arcuate inner surface 34 to control the insert distance of the sensor body insert 20 into the sensor housing 30. In one embodiment, threads 38 can be provided on the exterior of the sensor housing 30 for mating with threads located on a part having an opening to receive the sensor housing 30.

In one embodiment, the thermoplastic sensor housing 30 can be injection molded. In order to avoid knit lines or other areas where the flow front of multiple streams of thermoplastic come together and do not melt together creating small openings in the sensor housing 30, in one embodiment, the thermoplastic material can be injected into the die in a fountain flow gated at the end of sensor housing tip 33 of the sensor body insert housing 30.

Figure 4:
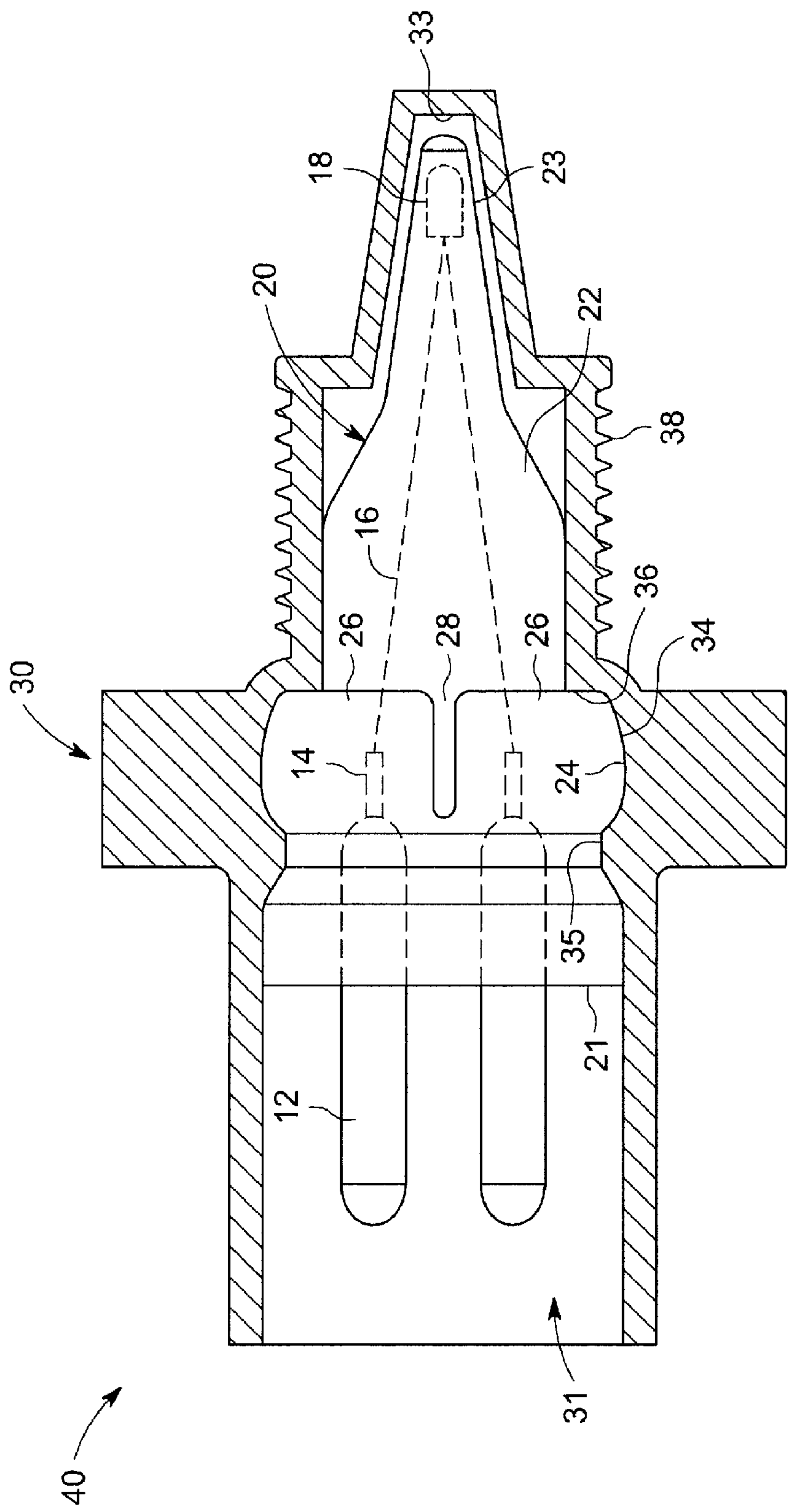
FIG. 4 is partial cross-section of a sensor assembly in one exemplary embodiment of the invention.

FIG. 4 illustrates an exemplary partial cross-section of a sensor assembly 40 in one exemplary embodiment of the invention. To better illustrate the invention, the exemplary sensor body insert 20 of FIG. 2 (non-cross-sectioned) has been shown inserted into the exemplary cross-section of a sensor housing 30 of FIG. 3. As illustrated in FIG. 3, the sensor body insert 20 is protected from the environment by the sensor body housing 30 such that, even if the sensing device 18 in the sensor body insert tip 23 were at or close to the surface of the sensor body cover 22 (e.g., if the sensing device 18 touched out during molding of the sensor body insert 20), the sensing device 18 is still fully enclosed by the sensor housing 30.

In order to assemble the sensor body insert 20 to the sensor housing 30, the sensor body insert 20 can be pushed axially into the sensor housing 30 causing the arms 26 of the arcuate ring 24 formed by the slots 28 to contact the ridge 35 in the sensor housing cavity 31. As the sensor body insert 20 is pushed axially into the sensor housing cavity 31, the radial force applied by ridge 35 bends the arcuate ring 24 (e.g., the arms 26) toward the sensor body cover 22 through the open space between the arcuate ring 24 and the sensor body cover 22. When sufficient axial force is applied to the sensor body insert 20 during assembly to push the arcuate ring 24 past the ridge 35 and be seated into the arcuate inner surface 34 circumscribing the sensor housing cavity 31, the sensor body insert 20 and the sensor housing 30 form a spherical-type snap-fit, preventing removal of the sensor body insert 20 from the sensor housing. Once assembled, removal of the sensor body insert 20 from the sensor housing 30 can require significant axial removal force that would most likely damage the sensor body insert 20. The fact that damage of the sensor body insert 20 would result from any attempted removal from the sensor housing 30 can be useful when determining if a customer has tampered with a sensor assembly 40 prior to seeking replacement of a defective part.

A number of different thermoplastic materials can be used for the sensor body insert 20 and the sensor body housing. The particular thermoplastic materials chosen for the sensor body insert 20 and the sensor housing 30, as well as the design of the shape and configuration of the arcuate ring 24, ridge 35, and the arcuate inner surface 34 (e.g., radii, number of slots, etc.), can determine the amount of assembly force and removal force required by the particular spherical-type snap-fit. In some embodiments, the sensor body insert 20 can be more flexible than the rigid sensor housing 30, while in other embodiments, the opposite configuration may be used (i.e., more rigid sensor body insert 20 and more flexible sensor housing 30). In one embodiment, the sensor body insert 20 can be made from PA 66 (i.e., Polyamide 6/6 or Nylon 6/6) while the sensor housing 30 can be made using PBT GF30 (i.e., polybutylene terephthalate with glass fiber reinforcement 30%). The selection of PBT GF30 can provide non-hydroscopic properties, when molded without knit lines, so moisture cannot penetrate to the sensing device 18. In other embodiments, other thermoplastics with similar flexural modulus and elongation properties can be used for the sensor body insert 20 and the sensor housing 30.

This particular combination of thermoplastic materials used with the exemplary design of the sensor assembly 40 shown in FIG. 4 can require approximately 50 lbs. of axial assembly force to assemble the sensor body insert 20 into the sensor housing 30. The choice of thermoplastic materials and design of the spherical-type snap-fit can be made to provide a particular range of acceptable assembly and removal forces (e.g., provide a certain assembly force to allow automation of the assembly process).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A sensor assembly comprising:

a sensor body comprising a sensing device connected to a sensor terminal;

a sensor body insert comprising said sensor body and a sensor body molding made of a first thermoplastic material that covers at least a portion of said sensor body, wherein said sensor body molding comprises a sensor body cover that contacts and covers said at least a portion of said sensor body, and an arcuate ring of greater diameter than, and extending around and radially outward of, at least a portion of said sensor body cover forming an open space radially separating said arcuate ring from said sensor body cover; and a sensor housing made of a second thermoplastic material comprising a sensor housing cavity for receiving said sensor body insert, wherein said sensor housing cavity comprises an arcuate inner surface circumscribing said sensor housing cavity shaped to receive said arcuate ring of said sensor body molding, and a ridge circumscribing said sensor housing cavity proximate to said arcuate inner surface, wherein during assembly of said sensor assembly, said sensor body insert is pushed axially into said sensor housing cavity causing said ridge to apply a radial force on said arcuate ring, bending said arcuate ring toward said sensor body cover and allowing said arcuate ring to pass said ridge and be seated in said arcuate inner surface forming a spherical-type snap-fit.

2. The sensor assembly of claim 1, wherein said arcuate ring of said sensor body molding further comprises a plurality of slots that form a plurality of arms in said arcuate ring to increase the flexibility of said arcuate ring.

3. The sensor assembly of claim 1, wherein said sensor housing cavity further comprises a step located after said arcuate inner surface to control the distance that said sensor body insert is inserted into said sensor housing cavity.

4. The sensor assembly of claim 1, wherein said first thermoplastic material is polyamide 6/6.

5. The sensor assembly of claim 1, wherein said second thermoplastic material is polybutylene terephthalate with glass fiber reinforcement.

6. The sensor assembly of claim 1, wherein said sensor body molding is more flexible than said sensor housing.

7. The sensor assembly of claim 1, wherein said sensor body molding is less flexible than said sensor housing.

8. The sensor assembly of claim 1, wherein said sensor assembly is a temperature sensor.

9. The sensor assembly of claim 1, wherein said sensing device is a ceramic NTC thermistor.

10. A sensor assembly comprising:

a sensor body comprising a sensing device connected to a sensor terminal;

a sensor body insert comprising said sensor body and a sensor body molding made of a first thermoplastic material that covers at least a portion of said sensor body, wherein said sensor body molding comprises a sensor body cover that contacts and covers said at least a portion of said sensor body, and an arcuate ring of greater diameter than, and extending around and radially outward of, at least a portion of said sensor body cover forming an open space radially separating said arcuate ring from said sensor body cover, wherein said arcuate ring further comprises a plurality of slots that form a plurality of arms in said arcuate ring to increase the flexibility of said arcuate ring; and a sensor housing made of a second thermoplastic material comprising a sensor housing cavity for receiving said sensor body insert, wherein said sensor housing cavity comprises an arcuate inner surface circumscribing said sensor housing cavity shaped to receive said arcuate ring of said sensor body molding, and a ridge circumscribing said sensor housing cavity proximate to said arcuate inner surface, wherein during assembly of said sensor assembly, said sensor body insert is pushed axially into said sensor housing cavity causing said ridge to apply a radial force on said plurality of arms of said arcuate ring, bending said arcuate ring toward said sensor body cover and allowing said arcuate ring to pass said ridge and be seated in said arcuate inner surface forming a spherical-type snap-fit.

11. The sensor assembly of claim 10, wherein said sensor housing cavity further comprises a step located after said arcuate inner surface to control the distance that said sensor body insert is inserted into said sensor housing.

12. The sensor assembly of claim 10, wherein said first thermoplastic material is polyamide 6/6.

13. The sensor assembly of claim 10, wherein said second thermoplastic material is polybutylene terephthalate with glass fiber reinforcement.

14. The sensor assembly of claim 10, wherein said sensor body molding is more flexible than said sensor housing.

15. The sensor assembly of claim 10, wherein said sensor body molding is less flexible than said sensor housing.

* * * * *